United States Patent
Shrinkle et al.

(10) Patent No.: US 7,580,218 B2
(45) Date of Patent: Aug. 25, 2009

(54) MAGNETIC HEAD TESTER USING MAGNETIC DISK WITH PRE-WRITTEN SERVO

(75) Inventors: Lou Shrinkle, Leucadia, CA (US); David Hu, Los Altos, CA (US); Peter Crill, Encinitas, CA (US); Matthew Yee, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 11/217,872

(22) Filed: Sep. 1, 2005

(65) Prior Publication Data

US 2007/0047124 A1    Mar. 1, 2007

(51) Int. Cl.
G11B 5/596    (2006.01)
(52) U.S. Cl. .................. 360/77.04; 360/77.08
(58) Field of Classification Search ......... None
See application file for complete search history.

(56) References Cited

U.S. PATENT DOCUMENTS

| | | | |
|---|---|---|---|
| 5,661,616 A | 8/1997 | Tran et al. ............... 360/77.12 |
| 6,097,565 A | 8/2000 | Sri-Jayantha et al. .... 360/78.09 |
| 6,310,742 B1 | 10/2001 | Nazarian et al. ......... 360/77.04 |
| 6,519,107 B1 | 2/2003 | Ehrlich et al. ............... 360/75 |
| 6,611,396 B1 | 8/2003 | Kermiche et al. ........ 360/77.04 |
| 6,952,320 B1 * | 10/2005 | Pollock et al. ........... 360/77.04 |
| 2002/0018314 A1 | 2/2002 | Takano et al. ................ 360/75 |
| 2002/0050814 A1 | 5/2002 | Nozu ......................... 324/210 |
| 2003/0058570 A1 * | 3/2003 | Min et al. ................. 360/77.04 |
| 2003/0128456 A1 | 7/2003 | Shitara et al. ............ 360/77.07 |

* cited by examiner

Primary Examiner—Jason C Olson
(74) Attorney, Agent, or Firm—Saile Ackerman LLC; Stephen B. Ackerman

(57) ABSTRACT

A method for operating a head testing apparatus (spin stand) using a mounted hard disk that has had its servo track information pre-written in an external servo-writing apparatus rather than in the testing apparatus itself. This insures more accurate servo-track writing and renders the testing operation more efficient. The problem of repeatable runout (RRO) associated with the transfer of a disk written in one machine to another is eliminated by forming a corrected position error signal (PES) by subtracting the average offset of one or more servo sector locations previously calculated using limited bandwidth operation of the servomechanism, from the position error signal generated during full bandwidth servo operation of the apparatus.

3 Claims, 2 Drawing Sheets

MAGNETIC HEAD TESTER USING MAGNETIC DISK WITH PRE-WRITTEN SERVO

BACKGROUND OF THE INVENTION

1. Field of the Invention

This invention relates generally to a device for testing magnetic read/write heads and more specifically to such a device in which there is a rotating magnetic disk on which servo information has been written.

2. Description of the Related Art

Before their installation in a conventional direct access storage device (DASD), magnetic read/write heads are first tested in a device specifically designed for the testing process. A magnetic head tester is basically a rudimentary disk drive that includes a drive motor and spindle (called a spin stand), at least one magnetic disk mounted on the drive motor spindle and capable of being rotated thereby, an actuator on which the head to be tested is mounted and an electro-mechanical system, called a servomechanism (or, equivalently, a servo-control mechanism), for accurately positioning the actuator (and its mounted head) relative to the rotating disk. The testing device also includes a micro-positioner and associated circuitry for writing servo-tracks, to be discussed below, on the magnetic disk, so that the head can be accurately positioned at target locations on the disk.

In order to test the read and/or write capabilities of a head, it is necessary to accurately position the head at various places on a disk mounted within the tester. To insure the accuracy of this positioning process, the disk mounted within the tester is furnished with embedded information, called servo information, which is data stored (as "bursts" of magnetic transitions) within sectors of small angular width that are periodically distributed along radially narrow, concentric, annular circular tracks on the disk. This servo information, which is written on the disk while the disk is already mounted in the tester, is written using a micro-positioner affixed within the tester and the head already mounted in the tester. The micro-positioner is a device that can incrementally move the head to proper positions at which to write the servo information.

The servo information identifies radial positions within the annular width of the tracks, so that the track center can be accurately located and it also identifies the angular positions of data-free sectors within the tracks, typically adjacent to the sectors containing the servo information, on which data can subsequently be written and read by the head during the testing process. The role of the servo data is of great importance in accurately positioning the head relative to the center of the track and in maintaining that position during portions of the testing process. Thus, servo data supplies both track identifying information and positioning information When the actuator mounted head seeks a particular position on the disk (the target position), which is typically the radial center of a track at some angular position along the track, the servo information located adjacent to that position is read by the head being tested and used to determine whether the head is actually located where it is supposed to be. This servo information is read immediately before the head reaches the target position and is transmitted to what is called servo-loop circuitry that is an integral part of the servomechanism of the tester. The difference (if it exists) between the intended location of the actuator (the target) and the actual location of the actuator as indicated by the adjacent servo data, generates a position error signal (PES) that is then used to correct the actuator positioning on the track. The PES, which is digital data, is supplied to a digital-to-analog converter (DAC) that generates a current proportional to the digital PES and, in turn, activates a voice coil motor (VCM), which is a current carrying coil positioned between permanent magnets. The VCM then responds to the DAC generated current and repositions the actuator.

There are many reasons why the actuator may be positioned incorrectly. Random vibrations can easily move the head slightly from its target, but much of the position error is related to the fact that the typical magnetic disk is slightly warped or generally fails to rotate perfectly on its spindle. Thus, even if the actuator is locked at what should be the fixed radial position of the target track's center line, the projection of the head on the rotating disk is not a circle concentric with the disk center, whereupon the head fails to follow the target track's center line and may, in fact, overlap several tracks.

The servo data, because of the process with which it is written, is presumably located on tracks that are essentially concentric circles of small radial width (circular annuli). Therefore, when the disk rotates improperly, there is a discrepancy between the track followed by the actuator (and mounted head) and a circular track produced by the servo data writing process. Nevertheless, the embedded servo data is supposed to rectify the improper tracking by means of the provided PES.

Writing accurate servo data on the disk is an important, expensive and time consuming task that is done within the head tester itself using an open-loop or closed-loop micro-positioner and the tester's head.

The additional elements within the tester needed to write servo data, including the micro-positioner and its associated circuitry, add greatly to the expense of the tester. In addition, the use of these additional elements, as noted, adds to the time required to complete the testing process. Even with the added time and expense, however, the repeatability of the servo pattern on a plurality of disks is often questionable and it is difficult to verify pattern accuracy. This is because the head testing device is not an optimal device within which to write servo data.

Takano et al. (US Patent Application Publication: US 2002/0018314 A1) describes a magnetic-disk evaluation apparatus in which servo information is both written on a disk and tested for its accuracy. In such a disk-evaluation process, servo information is first written on the disk in a temporary form, often by simply copying it from another disk. If this servo information is of sufficient accuracy, the disk can be tested for compliance with certain industry standards and, if those standards are met, the disk is then mounted within its final hard disk drive where more accurate servo information is written upon it. A problem arises if the temporary information is of insufficient accuracy to permit the disk to be mounted for writing of the permanent information. Takano et al. therefore provide a system in which the temporary servo signals can be evaluated using a measuring device and positioner to determine whether the arm of the evaluation apparatus is displaced from a target position by an unacceptable amount.

Shitara et al. (U.S. patent Application Publication No.: US2003/0128456) describes a magnetic head positioning control for a magnetic head certifier and magnetic disk certifier that includes a piezo actuator positioned between a suspension spring and a head carriage. The object of Shitara is to rectify the problem associated with the high speed at which the actuator mounted head must respond to servo signals that are being used to accurately position the head. Shitara's piezo positioner is claimed to be capable of more quickly and more precisely positioning a head in response to servo signals.

Although the present invention is not directed at providing an improved mechanism for writing temporary servo data or for more accurately controlling the position of an actuator, Takano and Shitara indicate the difficulties associated with both processes and, in that sense, provide a further justification and substantiation of our assertion that the elimination of such mechanisms from within the head tester itself will be highly advantageous.

The present invention, therefore, proposes the use of a disk in a head testing apparatus in which embedded servo data has been pre-written outside the testing apparatus by a dedicated servo disk writer. The sole task of a dedicated servo disk writer is to efficiently, accurately and repeatedly write servo information on disks. Such a device can do the job with much greater accuracy and repeatability than can be accomplished using a head tester with an included micro-positioner as a servo track writer. Moreover, by allocating the task of servo track writing to a device that is designed specifically to perform such a task, the necessity of using the head tester to perform the same task in a less exact, repeatable and efficient manner, is eliminated. Thus, the head tester can be simplified and dedicated to doing what it is meant to do, namely to test heads.

A problem arises, however, when a disk that has its servo tracks written in one apparatus is then transferred to another. The problem is a result of the fact that servo data is written on circular tracks that are substantially concentric when originally written on the disk, but these tracks will generally be eccentric when the disk is rotated by the drive spindle of the apparatus to which it is transferred (the host apparatus). This, of course, will be the inevitable result if the drive spindle of the original servo writer has even the slightest wobble or if the disk itself slips, is warped or off-center, or if the writing apparatus was subjected to thermal or mechanical shocks during the writing process or if the host apparatus has similar problems. Given that present 3.5" disks have a track pitch of approximately 100,000 tracks per inch (TPI), it can be seen that the radial width of each track is miniscule and that the slightest variations in track concentricity will be exacerbated by variability between machines or external perturbations. Thus, if a dedicated servo writer is to be used to write the servo information on a disk that is then mounted in a head tester, the head tester must have the ability to either eliminate or compensate for the eccentricities of the pre-written servo data.

The lack of track concentricity encountered by a head testing device attempting to read what are supposed to be concentric circular tracks is termed "repeatable runout" or RRO and, when it occurs, new writes by the read/write head, if the head is kept at a fixed radial position, can cross over several tracks and can overwrite previously written data. It is to be noted that the RRO problem is not restricted to head testing devices, but is also a common problem in the disk drives of actual DASD's themselves. Wherever it occurs, accurate positioning of the read/write head becomes nearly impossible without additional information being present to guide the head to the correct track positions and, when possible, to correct for RRO in some systematic way. This additional information, which is then used to actuate the locating and position-correcting servomechanisms within the drive unit, is the servo information within the tracks themselves.

Along with the repeatable runout that is associated with off-center drive spindles or warped disks, there is the more difficult problem of non-repeatable runout, NRRO, associated with random mechanical, electrical and thermal perturbations of the drive system and/or disk. In principle, the RRO is a stable periodic effect that does not change during operation of the tester, whereas NRRO can change with the external effects that cause it. Clearly, if the regular effects of RRO can be eliminated from the drive system, then the NRRO can be more easily addressed. In general, the servo data embedded in the disk provides enough information to fully characterize the effects of RRO and, therefore, it provides enough information to eliminate or significantly suppress those effects.

Repeatable runout in DASD disk drives (as opposed to head testing devices) has been addressed in the prior art in cases where the servo information is written by the same machine that subsequently uses it, or when the servo information is written in a different machine than the one that uses it. The most common case in DASD disk drives, is where the drive manufacturer writes servo information on the disk using the same drive mechanism that subsequently drives the disk during regular operation. In this case, the problem of transferring a disk from one apparatus to another does not occur.

Nazarian et al. (U.S. Pat. No. 6,310,742) teaches a method for canceling repeatable runout that is caused by unavoidable imperfections in the servo information writing process. The method "learns," and stores the actual positions of eccentric target data tracks by repeated sampling of the runout values of all the servo sectors written on the disk, then effectively cancels the effects of repeatable runout by subtracting, within the PES, each sector's measured runout value from the servo information actually written into that sector. In short, the servomechanism can concentrate on only correcting for NRRO, because the effects of the RRO have already been subtracted from the PES.

Sri-Jayantha et al. (U.S. Pat. No. 6,097,565) teach a "No-RRO Servo Architecture," where the RRO component is "ignored," ie. not tracked. The method removes the RRO component from the PES by subtracting a "locked arm" RRO prior to generating the servo-controller output. In other words, the actual radial position of the actuator is subtracted from the position stored in the servo location beneath it and this difference is essentially removed from the PES for that position. In this way, the arm of the disk drive is not constantly attempting to track an eccentric path and the PES effectively provides the servomechanism with only NRRO components of the disk motion. The methods of Nazarian and Sri-Jayantha are at least philosophically similar, although they differ in the details of the actual process by which runout data is gathered and subtracted from the PES.

Kermiche et al. (U.S. Pat. No. 6,611,396) teaches the use of a disk that is servo written off the spindle (ie. in an external servo writer) of a host disk drive DASD unit. In order to correct RRO for the disk when it is subsequently mounted in the host drive, a set of virtual tracks are defined on the disk by a set of intersections between the circular loci produced within the host drive and the physical tracks pre-written by the external servo writer. The virtual tracks are defined within storage as locations where the host read/write head intersects the servo wedges on the physical tracks.

SUMMARY OF THE INVENTION

It is a first object of this invention to make the writing of servo track data on disks used for testing read/write heads a more accurate, reproducible and efficient process and, thereby, to make the head testing process itself a more accurate, reproducible and efficient process.

It is a second object of this invention to achieve the first object without sacrificing the capability of that servo data to enable the accurate location of data tracks during the normal operation of the head testing device.

It is a third object of this invention to provide a method of eliminating the continual servomechanism corrections of repeatable runout (RRO) associated with a rotating disk mounted within a host head testing device when said disk has had its servo data written in a different device.

It is a fourth object of the present invention to improve servo accuracy in a head testing device by minimizing track following error associated with attempts by the head to follow an eccentric path.

It is a fifth object of the present invention to eliminate problems with mechanical hysteresis and resonance that occur when an actuator-mounted head requires rapid movements to follow track eccentricities that include the effects of repeatable runout.

It is a sixth object of the present invention to provide a less costly head testing device by eliminating the need for servo-writing components such as micro-positioners within the device itself.

The objects of the present invention are achieved by introducing a disk or a plurality of disks, each pre-written with servo data, into a head testing device and thereby eliminating the need for a servo data writing apparatus within the tester itself. The servo data is written onto the disk (or disks) using a dedicated servo writing apparatus, which, thereby, improves the quality of the servo tracks and, therefore, the accuracy, repeatability and efficiency of the head testing process. As a result, the servo-writing elements contained within the dedicated writer will no longer need to be made a part of the head tester, thereby significantly reducing the cost of the head tester as well as reducing the time required to complete the head testing process. The repeatable runout (RRO) associated with the use of pre-written disks is then effectively removed from the position error signal (PES) generated by the servomechanism within the tester, so that the RRO is effectively ignored and the actuator-mounted head does not follow an eccentric path. The RRO is made ignorable by the tester servomechanism by simply obtaining an excellent approximation to the RRO by averaging the runout values of selected servo track sectors (the differences between a fixed head location and a servo track location) while the actuator is operated at a low servo bandwidth. The average so obtained, which is an excellent approximation to the track runout, is then subtracted from the PES of the servomechanism while the servomechanism is operated at full bandwidth.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention teaches a method of operating a magnetic read/write head testing apparatus (commonly referred to as a "spin stand") using disks on which servo track information has been externally pre-written in a dedicated servo track writer. The head testing apparatus, therefore, lacks the servo-writing mechanisms that are now a part of the dedicated servo-writer.

Figure 1:
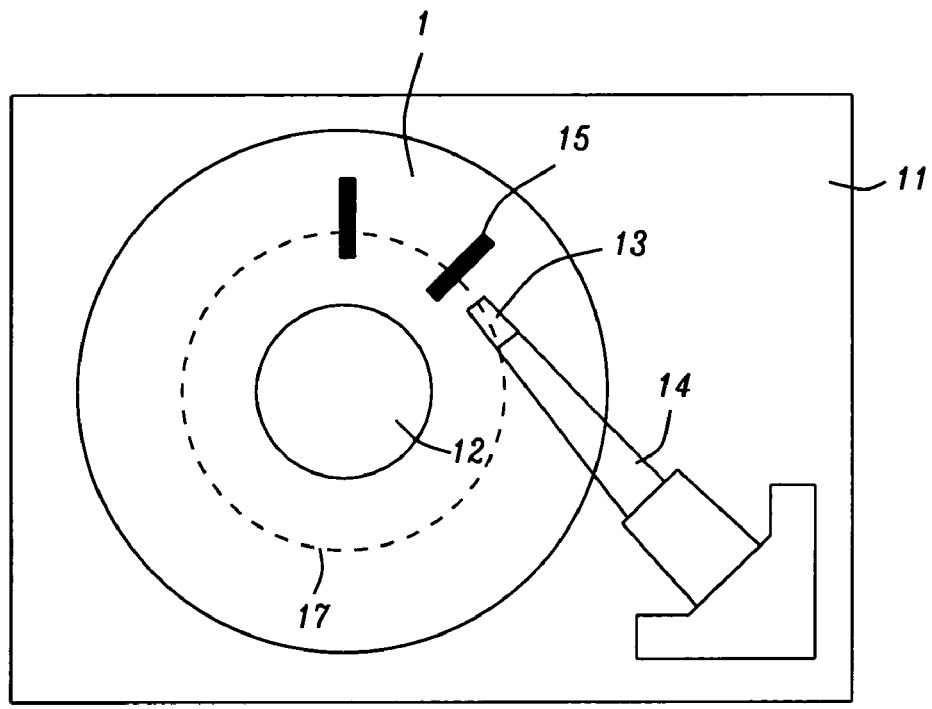
FIG. 1 shows a schematic illustration of a head testing apparatus (spin stand) that does not include a servo-writing mechanism and that therefore fulfills the object of the present invention.

Referring first to FIG. 1, there is shown a schematic illustration of a head testing apparatus (spin stand) that does not include a servo track writing apparatus such as a micro-positioner. In accord with the present invention, such servo track writing apparatus is not required in the head tester because the magnetic disk to be mounted therein is already pre-written with the necessary servo information through the use of an external servo track writing apparatus (not shown). FIG. 1 schematically shows such a typical head testing apparatus. The apparatus, sometimes called a "spin stand," includes a base (11) that supports a spindle motor (12). A disk (1) is mounted on the spindle motor and can be made to rotate at an arbitrary speed by the motor. In accord with the present invention, the disk (1) will be the pre-written disk shown in FIG. 2 and described below, on which servo information has already been written in a dedicated servo track writer. An actuator (14), adjacent to the spindle, supports the head to be tested (13). An electro-mechanical servomechanism (not shown) corrects the position of the actuator along an annular circular track (17), shown as a dashed circle, based on the reading of servo data that has been embedded in servo sectors (15) (only two being shown as darkened rectangles) on the disk surface (also shown in FIG. 2) and that intersect the track. Such correction is necessary because, for a variety of reasons discussed below, the hard disk does not maintain a constant center of rotation during operation of the head testing apparatus. The properties of such a servo-mechanism are well known in the art and, for the purposes of the description of this preferred embodiment it is sufficient to note that the servomechanism can operate within a range of bandwidths, related to the quantity of servo information that is extracted from the disk and actually used to correct the position of the actuator. The servo mechanism (not shown) incorporates a digital-to-analog converter (DAC) that produces a current proportional to a digital position error signal (PES), which is the difference between the target position to which the head has been sent (the radial center line of the track) and the position as indicated by the servo-data read by the head (typically not the target center line), which is embedded within the servo sector immediately beneath the head. This difference is also referred to herein as the position offset. The DAC current thereupon activates a voice coil motor (VCM) that moves the actuator accordingly so as to eliminate the positioning error. It is noted that the PES contains both the effects of both the RRO and NRRO. The servomechanism also includes a random access memory (RAM) in which data can be stored.

Figure 2:
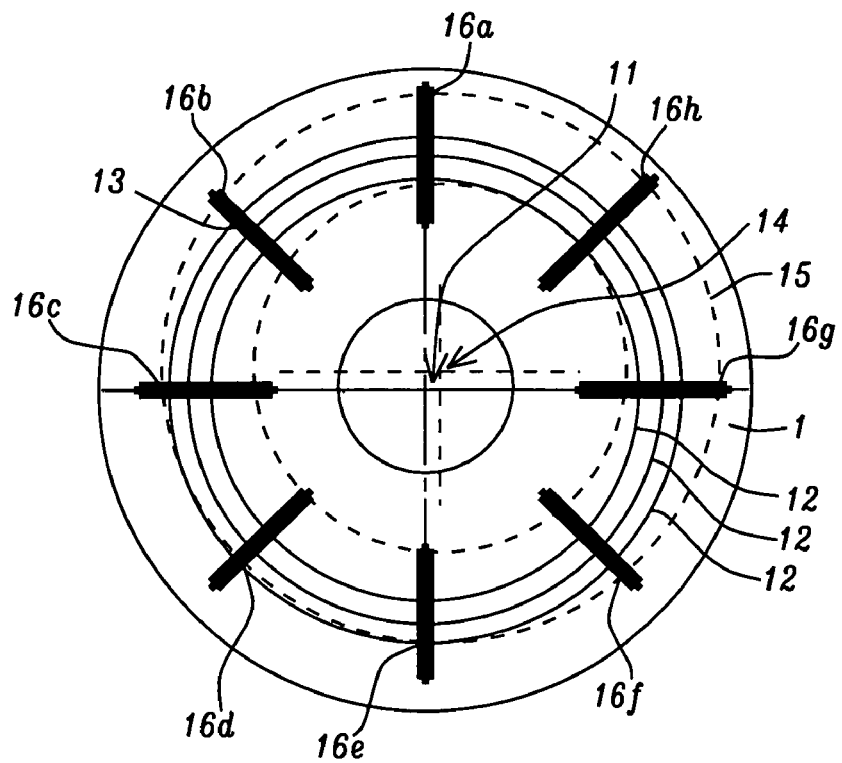
FIG. 2 shows in schematic form an overhead view of a typical externally servo-written disk that would be mounted in the head testing apparatus of FIG. 1 in accord with the method of this invention.

Referring now to FIG. 2, there is shown an exaggerated schematic illustration of a disk (1), such as that mounted in the tester of FIG. 1, on which the servo track data has been externally written in accord with the present invention. The center of rotation of the disk when it was mounted in the servo track writer is indicated as (11). The center of rotation of the disk as mounted in the head testing apparatus of FIG. 1 is indicated as (14). Differences in the location of these centers of rotation are at least partially responsible for the presence of RRO in the disk when it is operated in the host head testing device. Eight pre-written servo sectors (13) are shown as darkened, radially extending line segments. The thickness of the line segments is a schematic indication of the angular width of the sectors. In a real disk, there could be many more such sectors. These sectors intersect many of the externally written tracks (12) and contain servo data for each of them. These tracks were circular and concentric when written in the external servo-track writer and are indicated as such. Several dashed lines (15) represents circular paths that would be followed by the head if the head were set at a fixed radial position while the disk rotated about its center of rotation (14) with the spindle in the head tester. As can be seen, each of these tracks (15) is eccentric relative to the externally written tracks (12) and one track is shown intersecting the servo sectors at different radial positions (16a-f). This radially variable set of intersections is an indication of the repeatable runout of the originally concentric tracks when the disk is mounted in a different machine. If the actuator tries to track both the repeatable and non-repeatable runout of the originally circular path, which a servomechanism operating at full bandwidth can allow it to do, the actuator will be in a constant state of motion, which is undesirable.

Figure 3:
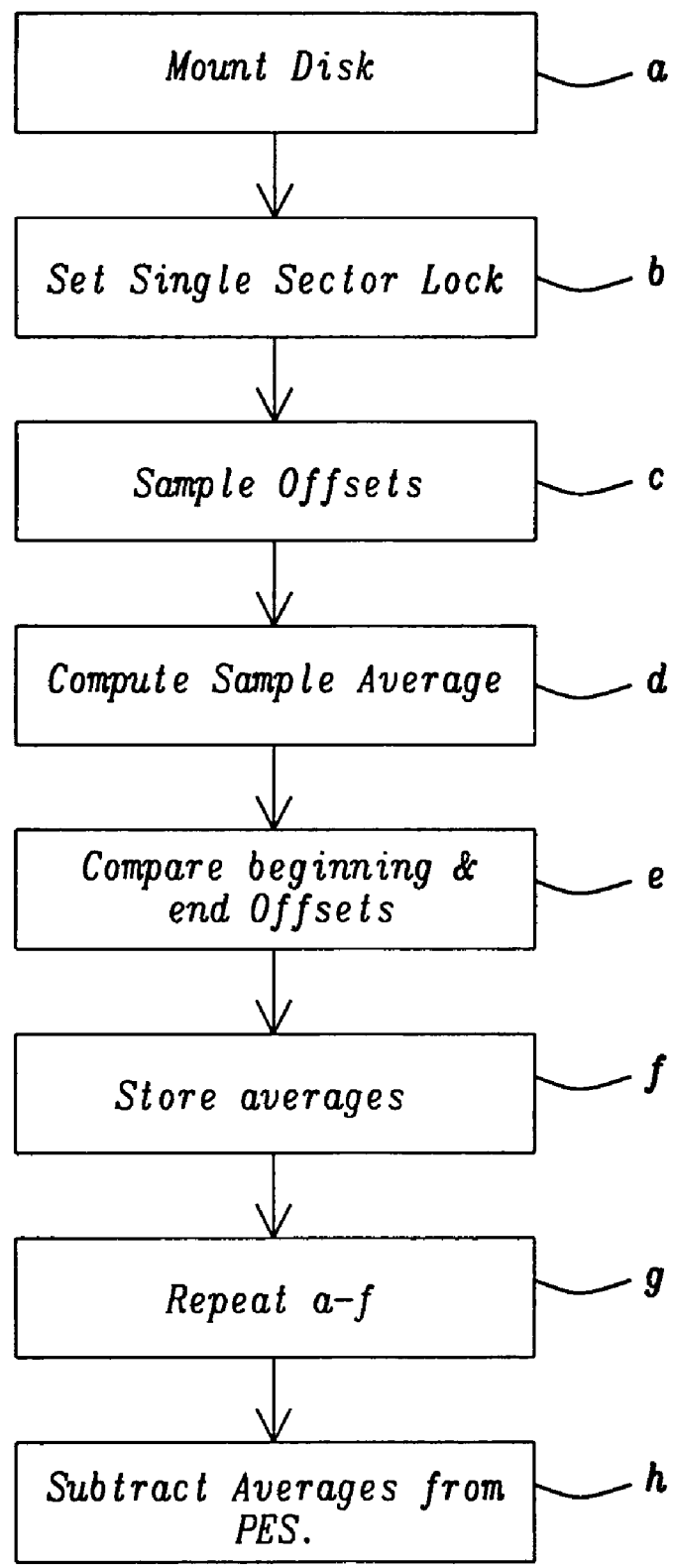
FIG. 3 is a flow chart describing the steps to correct for RRO using the method of the invention.

Referring to FIG. 3, there is shown a flow chart indicating a sequence of steps that will allow the information embedded in the externally written servo-tracks on the disk to be used to eliminate the continuous tracking by the actuator of the repeatable runout (RRO) associated with the eccentric tracks in the head tester. The flow chart steps are also indicated below together with an explanation of their effects within the method.

(a): MOUNT DISK IN TESTER. The pre-written disk is mounted on the spindle of the head testing apparatus of FIG. 1.

(b): SET HEAD TO A SINGLE SECTOR LOCKED POSITION AND SET SERVOMECHANISM TO A LOW BANDWIDTH CONDITION. The head within the testing device is made to follow a substantially circular track on the disk, concentric with the drive spindle, through the use of a single sector lock. The servomechanism is set to a low bandwidth condition, so that the head is in a relatively stable stationary state and exhibits minimal movement. The head is thereby able to take repeated samples of the position of a servo sector at the position of its intersection with a circular track that is concentric with the spindle of the head tester and to average those readings.

(c): REPEATEDLY SAMPLE POSITION OFFSET OF SECTOR. While the head is locked in this manner, the sector containing pre-written servo information moves in an eccentric path beneath the head and the position offsets of the sector location is repeatedly sampled in successive rotations of the disk. As many as 1000 rotations, on average, may be used. Each of these sampled offsets is the difference between the intersection position of the servo sector with the concentric circular track presently being followed by the fixed position of the head and the intersection position as identified by the positional data within the pre-written servo sector as produced by the external servo-track writer.

(d): COMPUTE SAMPLE AVERAGE. After a given number of offset samples are obtained, the average offset for the sector is calculated. This sample average provides an accurate indication of the eccentricity of the servo information and, thereby, a very good approximation to the RRO of the track itself. It is understood that the head testing apparatus includes a means, preferably a RAM within the servomechanism circuitry, but possibly also storage areas on the disk itself, for storing data such as these sector offsets. Because of the low bandwidth setting, the tester (i.e. the actuator and head) does not respond to the RRO or the NRRO. Since the NRRO will average to zero, the resulting average is the RRO.

(e): COMPARE POSITION OFFSETS OF BEGINNING AND END OF SAMPLING PROCESS. The servo offset at the beginning and end of the process is compared and the entire set of collected data is retained only if the beginning and end points of the process fall within a programmable amount of error. If the beginning and ending positions are too different from each other, then the head is presumed to have drifted too far during the revolutions of the disk. We only wish to retain sampled data that is obtained when the head is nearly stationary, because any significant drift will add to the observed RRO and invalidate the accuracy of the result.

(f): STORE AVERAGE SERVO OFFSET. To use the full bandwidth capability of the available servo sectors, the averaged servo offsets are stored in a random access memory (RAM) within the servomechanism circuitry of the head tester and used as a reference locus for the sector eccentricity.

(g): REPEAT (a)-(f) FOR MORE SECTORS IF DESIRED. The process can be used to sample the position offsets of any number of servo sectors, between a single such sector and the maximum number of such sectors formed using the dedicated servo track writer.

(h): SUBTRACT STORED AVERAGE OFFSETS FROM POSITION ERROR SIGNAL (PES) GENERATED DURING FULL BANDWIDTH OPERATION TO CREATE A CORRECTED PES AND USE CORRECTED PES FOR TRACKING AT FULL SERVO BANDWIDTH OPERATION. Servo control at full bandwidth is then applied to the actuator through a corrected PES sent to the DAC and voice coil motor. Because the averaged offset values are subtracted from the full bandwidth PES before the PES is sent to the DAC, the DAC will only correct deviations of target track locations from the averaged offsets. This requires that the DAC drive to the actuator be updated as every servo sector passes beneath the head so that the offset is removed from the signal and only sufficient current to correct for deviation of actual head position from the offset value is applied.

As is finally understood by a person skilled in the art, the preferred embodiment of the present invention is illustrative of the present invention rather than limiting of the present invention. Revisions and modifications may be made to methods, constructs, materials, structures and dimensions by which a head testing apparatus is operated without repeatable runout while using magnetic hard disks on which servo information has been pre-written off the drive spindle of the tester, while still providing such head tester operation in accord with the present invention as provided by the appended claims.

What is claimed is:

1. A method for operating a magnetic head tester comprising:
    providing a magnetic head tester, said tester including a motor driven rotating spindle on which a magnetic hard disk is to be mounted, a movable head actuator assembly, a read/write head to be tested that is affixed to said head actuator assembly, and an electro-mechanical servo-control system, operable at various bandwidths, for responding to a position error signal and controllably positioning said head at disk locations;
    mounting on said spindle a magnetic hard disk on which has already been formed, in an external device, a plurality of concentric circular tracks containing regularly spaced servo sectors, said servo sectors including embedded information defining radial and angular positions within each track, and wherein said concentric circular tracks are no longer concentric relative to said spindle and are offset therefrom;
    measuring and averaging offset values of the locations of selected servo sectors, by a method comprising:

setting the bandwidth of the servo-control mechanism to a minimum value so that all disk motions will be followed;

locking the actuator and head to read only the location of single servo sectors at a fixed selected radial position of the head;

reading and storing an initial location of a selected servo sector, $r_i$, as indicated by the embedded servo information therein, during an initial rotation of said disk;

reading and storing a location, r, of said servo sector during each of a series of subsequent complete rotations of the disk;

reading and storing a final location, $r_f$, of said servo sector during a final rotation of said disk;

comparing the initial location, $r_i$, and the final location $r_f$ of each of said sectors; and, if the initial and final locations differ by less than a programmable amount, then a minimal closure specification has been met; then computing and storing an average, over a chosen number of disk rotations, of all the repeatedly sampled servo sector locations, if it meets said closure specification, thereby eliminating the effects of non-repeatable runout at that sector and obtaining an accurate value of the repeatable runout; then using said average offset values to correct a position error signal for each of said sectors; and operating said head tester thereafter at a full servo control bandwidth, using said corrected position error signals to allow said actuator to follow a substantially circular path with minimal positional variations.

2. A magnetic head testing apparatus comprising:

a base;

a motor driven rotating spindle attached to said base;

a magnetic hard disk mounted on said spindle, said hard disk including concentric circular tracks and servo sectors formed externally to said head testing apparatus, wherein said servo sectors contain track coordinate information and wherein said circular tracks are no longer concentric relative to said spindle;

a movable head actuator assembly attached to said base adjacent to said spindle;

a variable bandwidth electro-mechanical servo-control mechanism, for controllably positioning a head mounted on said actuator above selected disk locations;

data stored in said electro-mechanical servo-control mechanism providing a means for defining an average locus of servo sector position offsets, said data being the average of repeated measurements of fixed positions of a plurality of servo sectors of said disk, said average being obtained over the course of repeated complete rotations of said disk while said servo-control mechanism is set at a minimum value bandwidth condition and wherein said average is stored only if the initial and final positions of said positions differ by no more than a programmable amount; and a position error signal can be derived from the difference between said locus of offsets and a current position of said head.

3. The magnetic head testing device of claim 2 wherein said average of repeated measurements is an accurate approximation to the repeatable runout of said sectors.

* * * * *